United States Patent [19]

Takenaka et al.

[11] 3,840,164

[45] Oct. 8, 1974

[54] RECORD TAPE HANDLING APPARATUS

[75] Inventors: George Takenaka, Santa Ana; John D. Gearheart, Covina, both of Calif.

[73] Assignee: Addmaster Corporation, San Gabriel, Calif.

[22] Filed: Aug. 30, 1973

[21] Appl. No.: 392,989

[52] U.S. Cl. .................... 226/90, 226/176, 226/187, 226/194

[51] Int. Cl. .................... B65h 17/20

[58] Field of Search ....... 226/90, 91, 175, 176, 177, 226/180, 181, 186, 187, 190, 194

[56] References Cited

UNITED STATES PATENTS

| | | | |
|---|---|---|---|
| 3,017,061 | 1/1962 | Hobart | 226/177 |
| 3,029,992 | 4/1962 | Roman | 226/180 |
| 3,132,785 | 5/1964 | Kunz | 226/190 X |
| 3,257,056 | 6/1966 | Cederberg | 226/176 |
| 3,506,271 | 4/1970 | Greifenhagen | 226/176 X |

*Primary Examiner*—Richard A. Schacher
*Attorney, Agent, or Firm*—Fred N. Schwend

[57] ABSTRACT

A simple and inexpensive data record tape drive mechanism for advancing the tape past a transducing station wherein capstans of different diameters may be readily interchanged to change the tape speed without affecting the location of the tape path.

11 Claims, 10 Drawing Figures

FIG. 1.
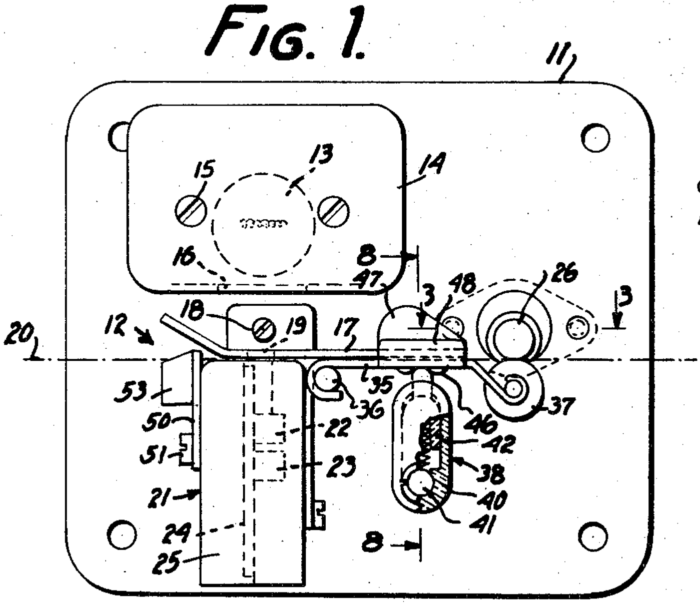
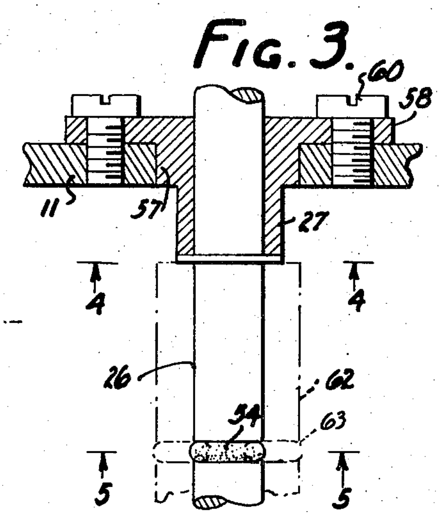
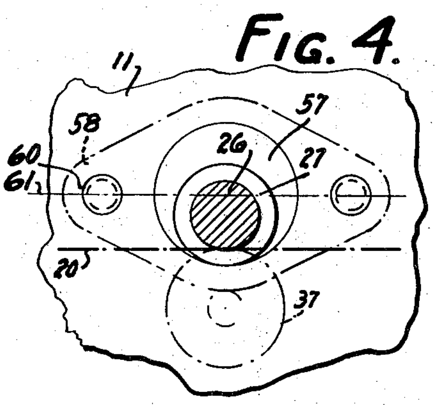
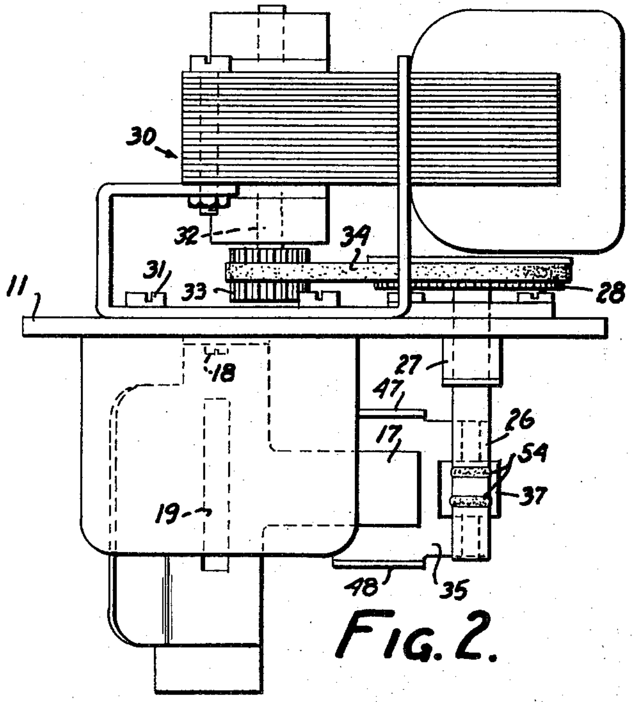
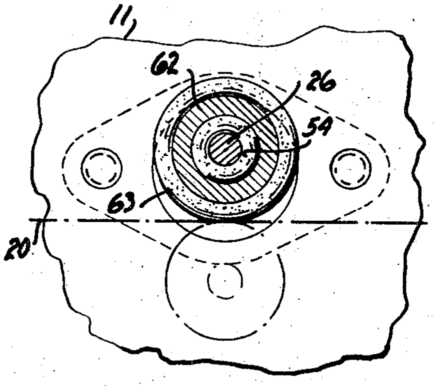
FIG. 5.

RECORD TAPE HANDLING APPARATUS

BACKGROUND OF THE INVENTION

Field of the Invention

This invention relates to data record tape handling mechanism and has particular reference to mechanism for feeding and guiding a tape past a transducing station.

SUMMARY OF THE INVENTION

A principle object of the present invention is to provide a simple, inexpensive and yet highly reliable record tape feeding mechanism for advancing the tape at different speeds past a transducing station.

Another object is to facilitate threading of a record tape in a tape handling device of the above type.

Another object is to enable changing of tape drive capstans of different diameters without changing the tape path.

A further object is to provide a compact tape handling mechanism having relatively few parts.

According to the invention, a simple and inexpensive tape drive mechanism is provided which is applicable to drive perforated, printed or magnetic record tape past a reading or recording station of a tape handling head. Drive capstan rollers of different diameters may be interchanged to vary the tape speed while employing a constant speed drive motor, simple means being provided for changing the position of the capstan axis so that the tape path may remain fixed.

Also, in order to facilitate threading of the tape in the head, a tape guide member carrying a pinch roller cooperable with the selected capstan, is pivotally supported for movement between a closed tape-guiding position wherein the pinch roller holds the tape in intimate contact with the capstan and an open threading position wherein the pinch roller is removed from the capstan. Edge-guiding flanges carried by the guide member are so arranged that one flange extends in edge-guiding relation to the tape in both the open and closed position of the guide member and the other is effective to edge-guide the tape only when the guide member is in closed position, thus enabling the tape to be laterally threaded onto the capstan. Yieldable means are provided to maintain the guide member in closed position so as to cause the pinch roller to effect adequate frictional contact between the capstan and the tape, the yieldable means being shiftable to permit the pivotal guide member to be moved to open or threading position.

BRIEF DESCRIPTION OF THE DRAWINGS

The manner in which the above and other objects of the invention are accomplished will be readily understood on reference to the accompanying drawings when read in conjunction with the following specification, wherein:

FIG. 1 is a front view of a tape head embodying a preferred form of the present invention.

FIG. 2 is a plan view of the tape head.

FIG. 3 is an enlarged sectional plan view of the capstan bearing and is taken substantially along the line 3—3 of FIG. 1.

FIG. 4 is a fragmentary sectional view taken along line 4—4 of FIG. 3, illustrating the capstan bearing.

FIG. 5 is a view similar to FIG. 4 but taken along line 5—5 and illustrating a second hollow capstan mounted in place.

DESCRIPTION OF THE PREFERRED EMBODIMENT

Figure 6:
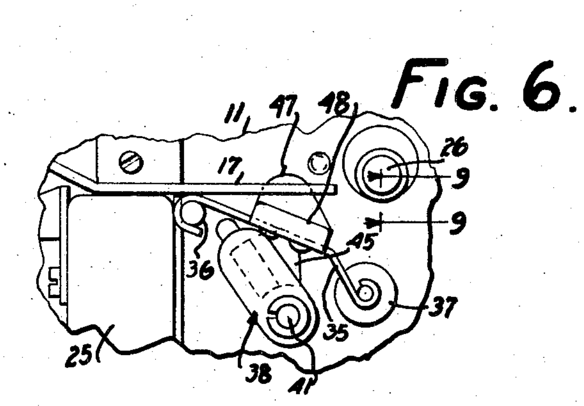
FIG. 6 is a front view similar to FIG. 1 but with parts broken away and illustrating the pivoted tape-guide member in open or threading position.

Referring to FIGS. 1 to 9 in particular, the tape head comprises a support plate 11, on the front face of which is mounted a transducer unit generally indicated at 12. Such unit includes a light bulb 13 located within a housing 14 which is secured in place by screws 15 and has an opening 16 to enable light from the bulb 13 to illuminate a rectangular opening 19 formed in a fixed tape guide member 17, the latter being attached to the front face of the support plate 11 by screw 18.

A perforation sensing unit generally indicated at 21 is suitably supported by the plate 11 below the guide member 17 and comprises a plurality of photo-cells, two of which are shown at 22 and 23. The latter are mounted on a vertically extending circuit board 24 which is enclosed within a housing 25 suitably secured to the plate 11. There is one photo-cell for each channel or row of perforations extending along the length of the tape and each photo-cell is so arranged that it will sense only the light passing through the opening 19 and a vertically aligned hole in a corresponding channel or row. Since the transducing unit 12 per se does not form a part of the present invention, it will not be described in further detail. However, it will be obvious that other forms of transducing units may be employed. For example, in cases where magnetic record tapes are to be handled, a magnetic read and/or record-head may be substituted for the unit 21.

The tape 20 is advanced past the transducing unit 12 and along the underside of the guide member 17 by a capstan 26 which is rotatably mounted in a bearing 27 (FIG. 3) supported by the plate 11 and has a cog wheel 28 (FIG. 2) secured thereto and located at the rear of the support plate 11.

The capstan 28 is driven by a single speed continuously rotating motor, generally indicated at 30, attached by screws 31 to the plate 11. The drive shaft 32 of motor 30 carries a drive cog wheel 33 which drives the cog wheel 28 through an endless flexible cog belt 34.

In order to maintain the tape 20 in its illustrated linear path shown in FIG. 1, from a suitable supply source (not shown) to a suitable take-up device (also not shown) a second guide member 35 is pivoted at one end on a stud 36 extending from the support plate 11 and rotatably carries at its opposite end a pinch roller 37.

A yieldable setting device generally indicated at 38 is provided to selectively yieldably set the guide member 35 in its upper tape-guiding position shown in FIG.

1 wherein the pinch roller 37 holds the tape 20 in driving engagement with the capstan 26 or alternatively to allow the guide member 35 to drop by gravity to its threading position as shown in FIG. 6 wherein the pinch roller 37 recedes from the capstan 26, permitting the tape to be threaded laterally into position.

The setting device 38 comprises a hollow body 40 pivotally supported on a stud 41 extending from the plate 11. A detent 42 is slidably mounted in the body 38 (see also FIG. 8) and is urged outwardly by compression springs 43 to normally yieldably engage the under side of the guide member 35. An end projection 44 on the detent 42 extends into an opening 45 in the plate 11 to limit swinging movement of the detent device 38.

When the detent device 38 is moved into its position shown in FIG. 1, it is detented between two spaced dimples 46 formed on the under surface of the guide member 35 and in such position guide member 35 extends closely adjacent and parallel to the fixed guide member 17 to define a tape-guiding passage. A pair of edge-guiding flanges 47 and 48 are formed on opposite edges of the pivoted guide member 35. Flange 47 is of sufficient height to always extend beyond the tape path even when the guide member 35 is in its open position. The flange 48 is of less width than flange 47. However, when the guide member 35 is in its raised or closed position (as shown in FIG. 1) both flanges 47 and 48 extend above the path of tape 20 and are thus effective to edge-guide the tape against lateral movement.

When the detent device is rocked counterclockwise it allows the guide member 35 to move into its open or threading position shown in FIG. 6 and in such case the flange 48 drops below the plane of the tape path while the flange 47 remains above such path. Thus, the tape may be readily threaded by moving the same laterally under the capstan 26 until it engages the flange 47.

Means are provided to edge-guide the tape at the entrance of the tape head. For this purpose, a forward edge-guide member 50 is secured by screws 51 to the side of the housing 25 and has a pair of edge-guiding ears 52 and 53 (see also FIG. 7) engageable with opposite edges of the tape.

Figure 9:
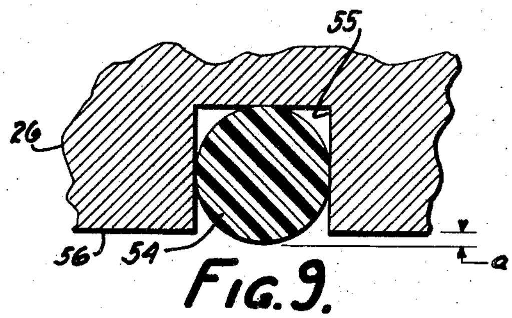
FIG. 9 is an enlarged fragmentary sectional view illustrating one of the traction rings fitted within its capstan groove and is taken along line 9—9 of FIG. 6.
Figure 8:
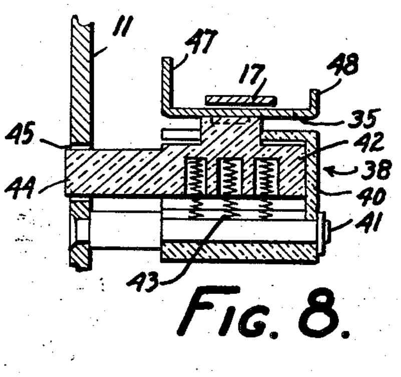
FIG. 8 is a transverse sectional view taken along the line 8—8 of FIG. 1.

In order to obviate slippage between the drive capstan 26 and the tape while driving the latter, a pair of relatively soft elastomeric traction O-rings 54 are mounted in circumferential grooves, i.e., 55, (FIG. 9) formed in the capstan 26. As seen in FIG. 9, each of the rings 54 is circular in cross-section and the outer surface of each ring normally extends a slight distance *a* beyond the periphery 56 of the capstan 26. However, the springs 43 of the detenting device 38 are sufficiently strong enough to cause the pinch roller 37 to deform the material of the rings 54 sufficiently to cause the outer surfaces of the rings to lie coextensive with the capstan surface 56 so that the tape 20 will contact the surface of 56 as it passes over the pinch roller 37 and will thus move at exactly the same velocity as a peripheral velocity of the capstan 26.

It will be noted on reference to FIGS. 3 and 4 that the bearing 27 has an eccentrically located circular hub 57 which is rotatably fitted in a mating hole formed in the support plate 11. Flanges 58 extend from diametrically opposite sides of the hub and are secured to the plate by clamp screws 60. Such screws 60 are located on a line 61 extending through the center of the hub 57.

When it is desired to increase the speed of the tape 20 past the transducing unit 12, a hollow capstan, i.e., 62, (FIGS. 3 and 5) is slidably fitted over capstan 26, the traction rings 54, in this case, gripping the capstan 62 to drive the latter. The hollow capstan 62 has an outer diameter equal to the diameter of capstan 26 plus twice the amount of eccentricity of hub 57. Thus, by removing screws 60 and rotating the bearing 27 by 180°, the point of tangency of the capstan 62 will be maintained coextensive with the plane of the tape 20 and therefore the tape path will not be altered.

The capstan 62 also carries a pair of elastomeric traction rings, one of which is shown at 63 (FIGS. 3 and 5) to insure traction between capstan 62 and the tape 20.

Alternatively, a second capstan (not shown) having a journal portion of the same diameter as the capstan 26 and a tape engaging portion of the same diameter as the hollow capstan 62 may be substituted for capstan 26.

Although the tape guide members 35 and 50 will accomodate tape of one width only, they may be readily interchanged with other guide members having differently spaced tape guide flanges or ears which will guide tapes of other widths.

DESCRIPTION OF MODIFIED FORM OF THE INVENTION

Figure 10:
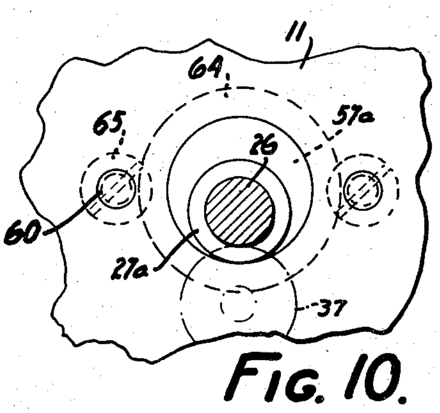
FIG. 10 is a sectional view similar to that of FIG. 4 but illustrating a modified form of the invention.
Figure 7:
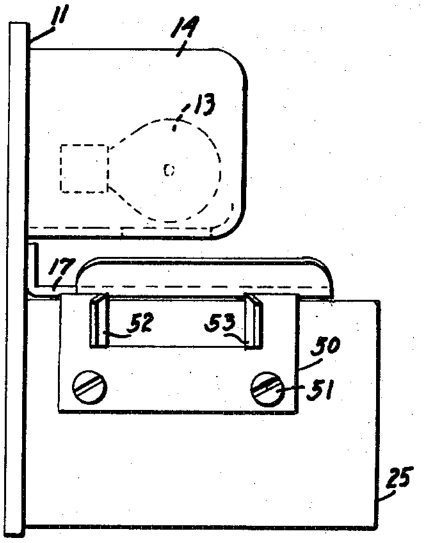
FIG. 7 is a left front elevational view of the tape head.

FIG. 10 illustrates a modified form of the invention wherein a bearing 27*a* is provided for rotatably supporting the capstan 26. In this case, an annular flange 64 is formed integral with an eccentric hub 57*a* carrying the bearing 27*a* and is clamped in any desired angular position by the overlapping heads 65 of clamp screws 60. In this case, capstan rollers (not shown) of different diameters may be used to drive the tape at different desired speeds and the bearing 27*a* may be rotated appropriate amounts to maintain the point of tangency in the plane of the tape path.

I claim:

1. A device for feeding a data record tape past a transducing station comprising
   means to defining a tape path,
   a support including a first bearing:
   a bearing member mounted in said bearing,
   a plurality of rotatable tape drive capstans of different diameters,
   said bearing member including a second bearing eccentric to said first bearing; said capstans being selectively rotatably supported by said second bearing;
   means for securing said bearing member in different rotated positions in said first bearing whereby to maintain said selected capstans tangentially aligned with said tape path, and
   means comprising a pinch roller for maintaining said tape in driving engagement with selected capstans.

2. A device according to claim 1 comprising
   a tape guide member for maintaining said tape in said tape path,
   said guide member being movable toward and away from tape-guiding position, and
   said guide member rotatably supporting said pinch roller.

3. A device according to claim 2 comprising edge-guiding means carried by said tape-guide member.

4. A device according to claim 2 comprising means for yieldably urging said tape-guide member toward said tape-guiding position whereby to cause said pinch roller to maintain said tape in frictional engagement with said selected capstan.

5. A device according to claim 2 comprising edge-guiding elements on said guide member, one of said guide elements being movable out of said tape path upon movement of said guide member out of said tape-guiding position.

6. A device according to claim 5 wherein the other of said guide elements extends in edge-guiding relation to said tape path upon movement of said guide member out of said tape-guiding position.

7. A device according to claim 1 wherein each of said capstans has a circumferentially extending groove on the outer periphery thereof, and an elastomeric traction ring in said groove, said traction ring being frictionally engageable with a tape extending over said capstan, and said traction ring also being frictionally engageable with a second said capstan extending over said first mentioned capstan whereby to drive said second capstan.

8. A device for feeding a data record tape past a transducing station comprising a support, a tape driving capstan carried by said support and spaced from said transducing station, means for rotating said capstan, a tape-guide member of said support intermediate said transducing station and said capstan, a second tape-guide member intermediate said transducing station and said capstan, means pivotally supporting said second guide member for movement between a tape-guiding position wherein said second guide member extends parallel to first guide member to define a tape path there between and a threading position wherein said second guide member extends at an angle to said first guide member, and a pinch roller carried by said second guide member, said pinch roller being engageable with a portion of said tape extending over said capstan when second guide member is in said tape-guiding position.

9. A device according to claim 8 comprising yieldable means for maintaining said second guide member in said tape-guiding position.

10. A device according to claim 9 wherein said yieldable means is selectively settable in and out of a position maintaining said second guide member in said tape-guiding position.

11. A device according to claim 8 comprising edge-guiding elements on said second guide member, at least one of said edge-guiding elements being movable into cooperative relation with said tape upon movement of said guide member into said tape-guiding position and being movable out of cooperative relation with said tape upon movement of said guide member into said threading position.

* * * * *